US012510063B2

(12) United States Patent
Marion et al.

(10) Patent No.: US 12,510,063 B2
(45) Date of Patent: Dec. 30, 2025

(54) METHOD AND PUMP FOR LOW-FLOW PROPORTIONAL METERING

(71) Applicant: DOSATRON INTERNATIONAL, Tresses (FR)

(72) Inventors: Thibault Marion, Floirac (FR); Richard Mahieux, Cursan (FR)

(73) Assignee: DOSATRON INTERNATIONAL, Bordeaux (FR)

( * ) Notice: Subject to any disclaimer, the term of this patent is extended or adjusted under 35 U.S.C. 154(b) by 85 days.

(21) Appl. No.: 18/548,688

(22) PCT Filed: Feb. 25, 2022

(86) PCT No.: PCT/EP2022/054788
§ 371 (c)(1),
(2) Date: Sep. 1, 2023

(87) PCT Pub. No.: WO2022/184576
PCT Pub. Date: Sep. 9, 2022

(65) Prior Publication Data
US 2024/0309864 A1 Sep. 19, 2024

(30) Foreign Application Priority Data
Mar. 2, 2021 (FR) ...................................... 2102019

(51) Int. Cl.
*F04B 9/04* (2006.01)
*F04B 9/10* (2006.01)
(Continued)

(52) U.S. Cl.
CPC ................ *F04B 9/047* (2013.01); *F04B 9/10* (2013.01); *F04B 13/00* (2013.01); *F04B 43/06* (2013.01);
(Continued)

(58) Field of Classification Search
CPC .. F04B 9/047; F04B 9/10; F04B 13/00; F04B 43/12; F04B 43/06; F04B 49/20; F17D 1/17
See application file for complete search history.

(56) References Cited

U.S. PATENT DOCUMENTS 4,756,329 A * 7/1988 Cloup ..................... F04B 13/02 417/403
5,234,322 A * 8/1993 Daniels .................. F04B 13/02 417/403
(Continued)

FOREIGN PATENT DOCUMENTS

DE 2213298 A1 9/1973
DE 102008019783 A1 11/2008
(Continued)

OTHER PUBLICATIONS

International Search Report issued Apr. 8, 2022, in corresponding International Application No. PCT/EP2022/054788, 6 pages.

*Primary Examiner* — Charles G Freay
(74) *Attorney, Agent, or Firm* — Edell, Shapiro & Finnan, LLC

(57) ABSTRACT

A proportional metering method and its associated pump, which includes: a hydraulic machine enclosing a member suitable for performing an alternative movement, supply to the machine at the inlet triggering an alternative translational movement by the member, a volumetric pump, provided with a rotational axis, an inlet intended to be placed in fluid communication with an additive tank, and an outlet in fluid communication with the outlet of the machine, a movement converter for converting the alternative translational movement of the member into a rotational movement, the rotational movement being transmitted to the rotational axis of the volumetric pump, such that supplying the machine
(Continued)

operates the volumetric pump, which thus supplies the outlet of the hydraulic machine with additive.

15 Claims, 4 Drawing Sheets

(51) Int. Cl.
*F04B 13/00* (2006.01)
*F04B 43/06* (2006.01)
*F04B 43/12* (2006.01)
*F04B 49/20* (2006.01)
*F17D 1/17* (2006.01)

(52) U.S. Cl.
CPC .............. *F04B 43/12* (2013.01); *F04B 49/20* (2013.01); *F17D 1/17* (2013.01)

(56) References Cited

U.S. PATENT DOCUMENTS

| | | | | |
|---|---|---|---|---|
| 5,951,265 | A * | 9/1999 | Bryant | F04B 9/105<br>417/403 |
| 9,303,634 | B2 * | 4/2016 | Furet | F04B 43/067 |
| 2019/0162210 | A1 * | 5/2019 | Starkey | F04B 17/03 |

FOREIGN PATENT DOCUMENTS

| | | | |
|---|---|---|---|
| EP | 3290696 | A1 | 7/2018 |
| FR | 2681646 | A1 | 3/1993 |

* cited by examiner

[Fig. 4]
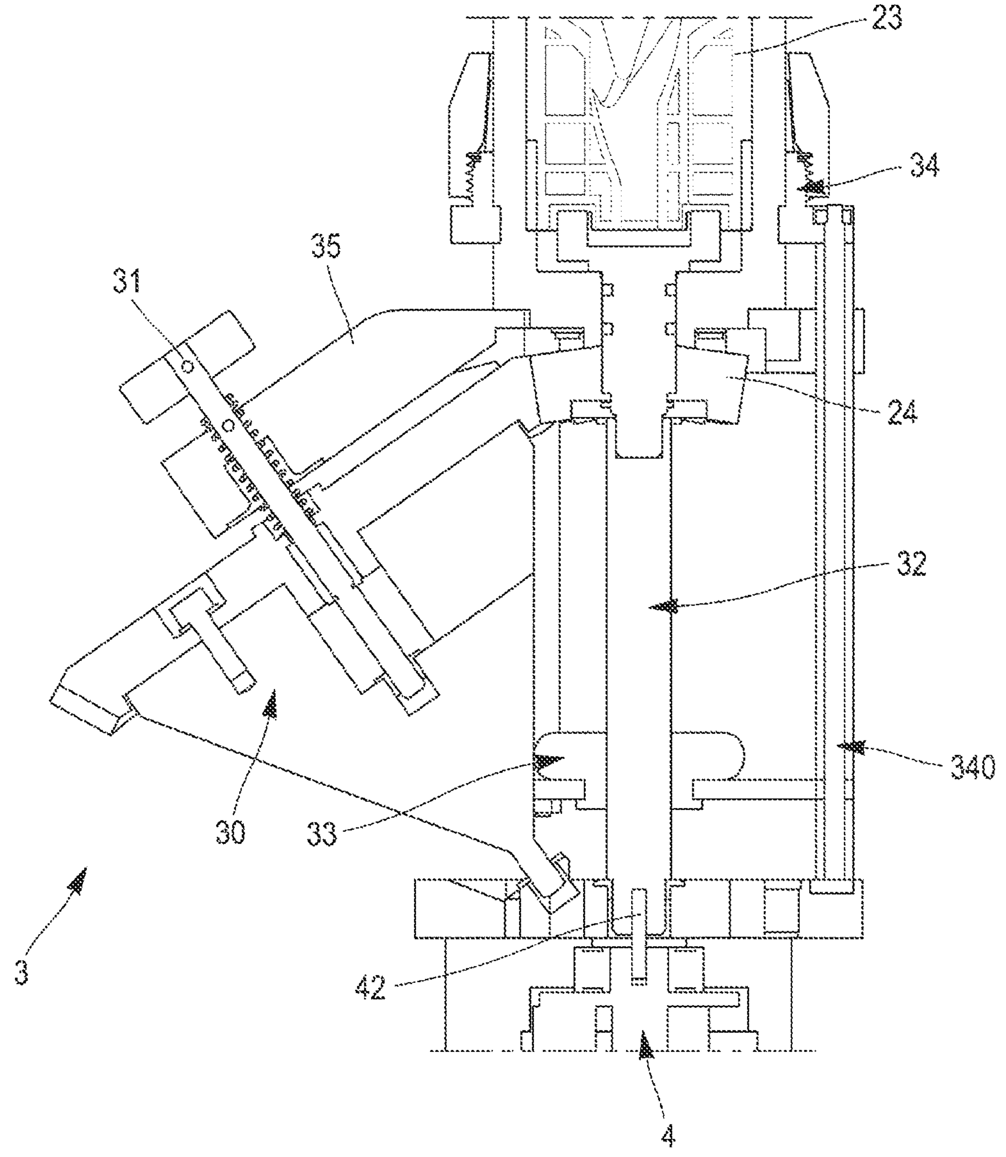

METHOD AND PUMP FOR LOW-FLOW PROPORTIONAL METERING

FIELD

The present invention relates to a proportional dosing method and pump for introducing a liquid additive into a main liquid stream circulating in a duct, the pump being of the reciprocating differential piston type for taking the additive from a container and dosing it, this pump including a first inlet for receiving a main liquid flow which drives the pump, a second inlet for taking the additive and an outlet for the mixture of additive and liquid.

BACKGROUND

Usually, and as described in EP 3440353 B1, the differential piston performs a reciprocating motion and drives a plunger piston to take the additive to be dosed during an upward stroke and to inject this additive into the main liquid or functional liquid during a downward stroke.

However, when the objective is to obtain low doses, that is, less than 300 ppm, or even in the order of a few tens of ppm, the proportional dosing pump can no longer provide such a dose.

Indeed, conventional suction devices do not allow a sizing that can take a sufficiently small amount of additive at each cycle.

The proportional dosing pump then provides a much higher dosage than is required.

For this reason, the purpose of the invention is, above all, to provide a method and a proportional dosing pump which no longer have, or have to a lesser degree, the drawbacks previously discussed and which make it possible to optimise the operation of proportional dosing pumps, in particular where the targeted dosages are low.

SUMMARY

The invention is based especially on the replacement of prior dosing mechanisms by pumps of the displacement type, that is pumps in which the fluid is transferred by means of a movement of volume at each cycle. The flow rate of a displacement pump is then proportional to the speed of actuation of its moving elements and depends very little on the discharge pressure.

According to a preferred embodiment, the invention is based on the replacement of previous dosing mechanisms by pumps of the peristaltic type, that is, pumps able to suck and discharge a liquid when operating at low speed, that is, at speeds of less than a few revolutions per hour.

One object of the invention is in particular a proportional dosing pump comprising a hydraulic machine provided with an inlet and an outlet, the hydraulic machine extending along a longitudinal axis (x) and enclosing a member fit for performing a reciprocating motion along this axis, the supply of main liquid to the inlet of the hydraulic machine triggering a reciprocating translational motion of the member along the longitudinal axis (x), characterised in that the proportional dosing pump includes:

a displacement pump, provided with an axis of rotation, an inlet intended to be placed in fluid communication with an additive reservoir and an outlet in fluid communication with the outlet of the hydraulic machine, a motion converter provided to transform the reciprocating translational motion of the member into a rotational motion, said rotational motion being transmitted directly or indirectly to the axis of rotation of the displacement pump, so that the supply to the hydraulic machine actuates the displacement pump which thus supplies additive to the outlet of the hydraulic machine, the additive mixing with the main liquid at the outlet of the hydraulic machine.

Optional, complementary or substitutional characteristics of the invention are set out below.

According to a preferred embodiment, the displacement pump may be a peristaltic pump.

According to another preferred embodiment, the pump may further include a variator provided to adjust the speed of rotation from the motion converter.

According to an embodiment relating to the motion converter, the motion converter may include a rotor provided with at least one helical rail and an actuator which each extend longitudinally along the longitudinal axis (x), the actuator being connected at one of its ends to the member of the hydraulic machine and cooperating with the helical rail of the rotor, as well as an outlet rotationally connected to the rotor and being preferably in the form of a pinion, the raising and then lowering of the member inducing rotation of the rotor in the same direction.

According to a certain feature of the abovementioned embodiment, the actuator may comprise a shaft connected to the member of the hydraulic machine, a first piston pin mounted perpendicularly to the actuator shaft, the first piston pin being provided to slide at a first end in a first rectilinear rail arranged in the body of the motion converter, while the second piston pin is provided to slide at a first end in a first helical rail arranged on the rotor.

According to another feature of the abovementioned embodiment, the actuator may comprise a shaft connected to the member of the hydraulic machine, a first piston pin and a second piston pin mounted perpendicularly to the shaft of the actuator, the first piston pin being provided to slide at a first end and at a second end respectively in a first rectilinear rail and in a second rectilinear rail arranged in the body of the motion converter, while the second piston pin is provided to slide at a first end and at a second end respectively in a first helical rail and in a second helical rail arranged on the rotor.

Advantageously, the shaft can be connected to the member of the hydraulic machine by means of a pivot connection.

According to an embodiment relating to the variator, the variator may comprise an output shaft, a toothed cone, the axis of revolution of which is inclined relative to the output shaft, so that one of its profile ridges extends in parallel to the output shaft, a roller rotationally integral with the output shaft and capable of translating along the output shaft, the output pinion of the converter meshing with the toothed wheel of the cone, the toothed cone rotationally driving the roller by adhesion as well as the output shaft, itself driving the shaft of the displacement pump.

According to a certain feature of the abovementioned embodiment, the variator may further comprise means for adjusting the position of the roller on the output shaft of the variator, these means including a support for fixing the roller, further integral with a stuffing box mounted to the body of the rotor and the tightening/loosening of which on the body of the rotor allows the movement of the roller along the output shaft of the variator.

According to another feature of the above-mentioned embodiment, the variator may include disengagement means enabling the surface of the cone to be moved away from the roller, so as to prohibit adhesion drive of the roller.

Advantageously, the disengagement means may consist of a pull rod passing through a support integral with the body of the motion converter and anchored into the toothed cone, and of a spring mounted compressed to said pull rod to press the cone against the roller, tension on said pull rod further compressing the spring and enabling the cone to be moved away from the roller.

Advantageously, the proportional dosing pump may include an injection T supplied by the outlet of the hydraulic machine and by the displacement pump outlet.

In this case, preferably, the injection T can be provided with a first non-return valve and a second non-return valve provided respectively to prevent backflow to the hydraulic machine and to the displacement pump.

One object of the invention is also a proportional dosing method implementing a proportional dosing pump in accordance with the invention, and wherein the following steps are carried out:

- the inlet of the displacement pump is connected to a container filled with the additive to be dosed,
- the inlet of the hydraulic machine is connected to a source of main liquid,
- the variator provided to adjust the speed of rotation resulting from the motion converter, is adjusted as a function of the expected dosage,
- the inlet of the hydraulic machine is supplied with main liquid at a predetermined flow rate, so that the supply to the hydraulic machine actuates the displacement pump which thus supplies the outlet of the hydraulic machine, or the injection T if the outlet of the pump is provided with an injection T, with additive, the additive mixing with the main liquid.

BRIEF DESCRIPTION OF THE DRAWINGS

Further advantages and features of the invention will become apparent upon reading the detailed description of implementations and embodiments, which are by no means limiting, and the following appended drawings:

FIG. 4 This figure represents a detail of the variator of a proportional dosing pump according to an embodiment of the invention.

DETAILED DESCRIPTION

Figure 1:
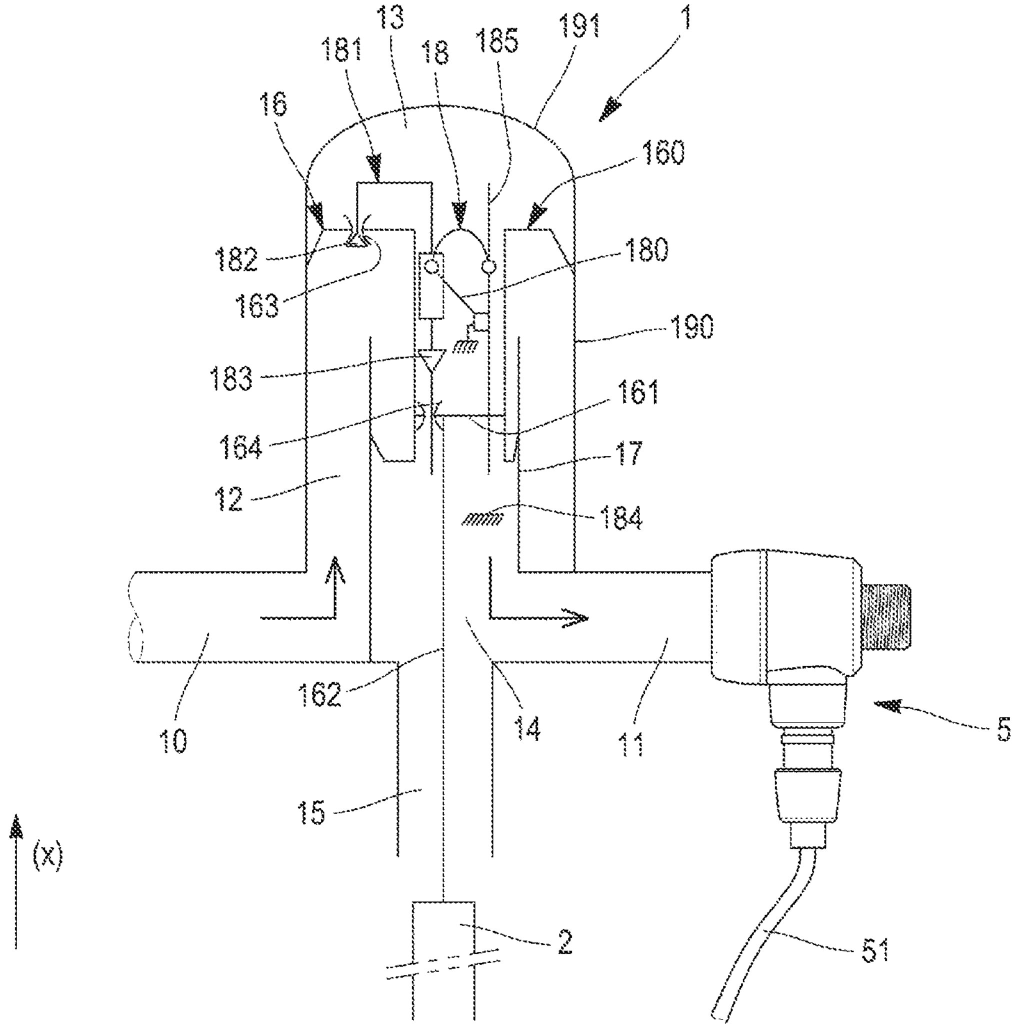
FIG. 1 This figure represents a schematic view of a hydraulic machine usable in the invention.

Turning to [FIG. 1], a hydraulic machine 1 of the type used in the proportional dosing pump according to the invention can be seen.

The hydraulic machine 1 comprises a reciprocating differential hydraulic piston 16 contained in a casing 190 consisting of a cylindrical body extending along an axis (x) and having thereon a cover 191 assembled to the body removably, especially by screwing. The member, also called the differential piston 16, is disposed in the casing 190 so as to slide in an alternating motion along the axis (x). In the upper part thereof, the member 16 includes an upper ring 160 of large cross-section, the periphery of which bears sealingly against the inner wall of the casing. The barrel of the differential piston, coaxial with the casing and has a smaller diameter than the upper ring 160, is integral with this ring and extends downwards. The lower part of the piston barrel slides sealingly in a cylindrical housing 17 coaxial with the casing. The barrel is closed at the bottom by a lower base 161. The differential piston 16 and the cylindrical housing 17 partition the inside of the casing into a so-called “mixture” chamber 14 delimited by the cylindrical housing 17 and the lower base of the differential piston 161, a so-called “upper” chamber 13 delimited by the upper ring 160 and the cover 191 of the casing, and a so-called “lower” chamber 12, substantially annular in shape, delimited by the part below the upper ring 160, by the casing and by the cylindrical housing 17.

The hydraulic machine comprises a first manifold 10 connecting the lower chamber 12 to the outside, and a second manifold 11 connecting the mixture chamber 14 to the outside. A cylindrical sleeve 15 coaxial with the casing extends downwards from the mixture chamber to allow the mixture chamber to be connected to an injection device 2. This injection device is actuated by the hydraulic machine by means of a piston rod 162, itself connected to a means for pumping the additive (not represented in the figures). For further details relating to this type of device, reference may be made to EP0255791 and EP1151196.

Hydraulic switching means are provided for supplying and draining the chambers 12, 13, 14 separated by the piston. These switching means are controlled by the movements of the piston and include a connecting rod 180 acting on a distribution member which can assume two stable positions. More precisely, the distribution member comprises at least one valve holder 181 comprising at least one so-called “upper” first valve 182 cooperating with a seat 163 formed in the upper ring of the piston, and at least one so-called “lower” second valve 183 cooperating with a seat 164 formed in the lower base of the piston.

The hydraulic machine further includes triggering means comprising a pusher 185 fit for causing, at the end of the stroke of the piston, by bearing against a stop, an abrupt change in the position of the switching means under the action of an elastic means 18, in order to reverse the stroke of the piston. Bearing against a stop (not represented in the figures) takes place in the vicinity of the cover 191 to enable the piston to change its upward stroke to a downward stroke. Bearing against a stop 184 also takes place in the vicinity of the lower part of the casing to allow the piston to change its downward stroke to an upward stroke.

The connecting rod 180 is hinged at one end to a point fixed relative to the piston 16, while the other end of the connecting rod can move in a vertical window of the valve holder 181 and bear against one of the two ends of this window, in one of the two stable positions of the distribution member. At each of its ends, the elastic means 18 is integral with a hinge member received respectively into a housing provided on the connecting rod and on the pusher 185. Each housing is open in a direction substantially opposite to the direction of the force exerted by the elastic means 18 in the wall of the housing considered. Advantageously, this elastic means 18 may consist of a convex leaf spring.

The inlet of the hydraulic machine for the main liquid is located at the first manifold 10, and the outlet for the mixture is located at the second manifold 11.

According to the cycle associated with this configuration, the pressurised main liquid, generally water, enters the lower chamber 12 through the manifold 10. The upper valves are closed whereas the lower valves are open, allowing the discharge of the liquid from the upper chamber 13 to the mixture chamber 14 and then draining of the mixture towards the outlet via the manifold 11. Indeed, under the action of the pressure of the main liquid on the lower face of the upper ring of the piston, the latter begins an upward stroke, which tends to decrease the volume of the upper chamber and therefore to expel its contents towards the mixture chamber, since communication is open.

At the end of the upward stroke, the pusher 185 bears against a stop connected to the cover 191, which, under the effect of the leaf spring, causes the connecting rod 180 to tip towards the other, low stable position, moving the valve holder towards the base of the piston. The lower valves close and the upper valves open. The pressurised liquid can pass from the lower chamber 12 to the upper chamber 13, whose communication with the mixture chamber 14 is now cut off, and the motion of the piston is reversed. This motion is reversed due to the pressure that the main liquid let into the upper chamber exerts on the upper face of the upper ring. At the end of its downward stroke, the lower end of the pusher 185 meets a stop 184 integral with the casing 190, which causes the connecting rod to tip again towards the raised position and the valve holder 181 to move, as a result the upper valves close and the lower valves open. The motion of the piston 16 is again reversed and the piston starts to move again in an upward stroke.

At the same time, the reciprocating motion of the piston during the supply of liquid to the hydraulic machine enables suction to be alternately generated up to the outlet 11, the latter being connected to an injection device 2, also called a dosing mechanism 2.

The hydraulic machine may also be of the type described in EP1971776 A1 and in [FIG. 1].

This hydraulic machine comprises a casing including a body and a cover, a separating means fit for performing a reciprocating motion in the casing between the body and the cover, this separating means defining two chambers. The hydraulic machine also comprises hydraulic switching means for supplying liquid to and draining the above-mentioned chambers. These switching means comprise a distribution member that can assume two stable positions and is controlled by the movements of the separation means. The body of the casing also encloses a compartment connected to a pressurised liquid intake and in which the switching means are housed, as well as triggering means comprising a pusher connected to the separating means, fit for causing, at the end of the stroke, an abrupt change in the position of the switching means, under the action of an elastic means, to reverse the stroke. The distribution member comprises a distribution slide applied against a planar plate fixed relative to the body of the casing, the distribution slide being able to slide sealingly, without a seal, against the plate which includes ports connected respectively to the chambers of the casing and to a liquid outlet port. According to its position, the slide is provided to close some of the ports or connect them to the fluid intake or exhaust.

Figure 2:
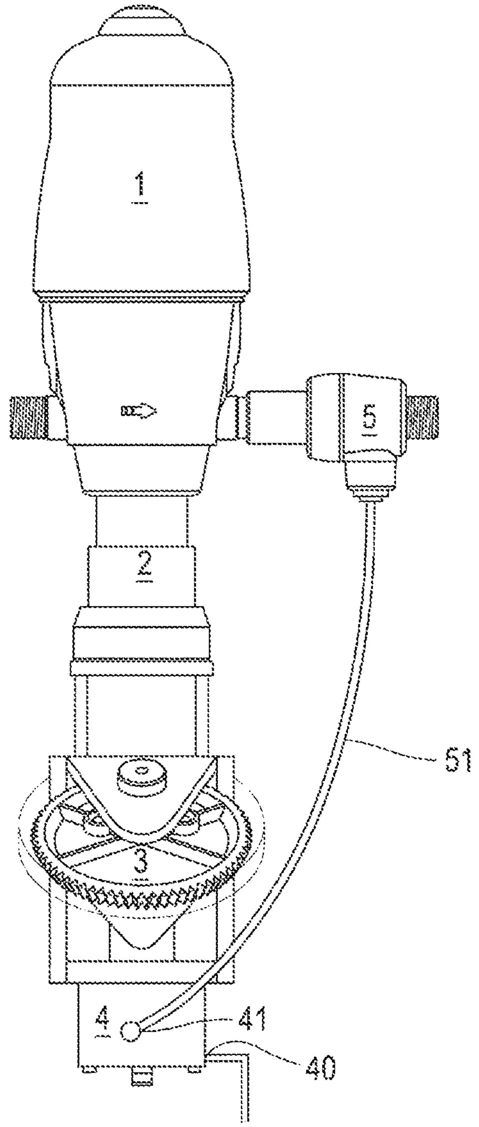
FIG. 2 This figure represents a schematic profile view of a proportional dosing pump according to the invention.

As described in [FIG. 2], the proportional dosing pump according to the invention comprises a hydraulic machine 1 such as those described previously. This machine is thus provided with an inlet 10 and an outlet 11, the hydraulic machine extending along a longitudinal axis x and enclosing a member 16 fit for performing a reciprocating motion, the supply of liquid to the inlet of the pump triggering a reciprocating translational motion along the longitudinal axis x of the member 16.

The proportional dosing pump includes a displacement type pump 4, provided with an drive shaft 42, an inlet 40 intended to be placed in fluid communication with a reservoir, and an outlet 41 in fluid communication 51 with the outlet 11 of the hydraulic machine.

By displacement pump, it is meant a pump in which a certain amount of "trapped" fluid is forced to move to the outlet port.

The flow rate of a displacement pump is proportional to the speed of actuation of its moving elements and depends very little on the discharge pressure; on the other hand, the energy consumed by the pump is proportional to the pressure difference between the outlet and the inlet of the pump.

Advantageously, the displacement is a pump peristaltic pump.

By peristaltic pump, it is meant a pump used to produce a flow of fluids, either liquids or gases. The fluid, liquid or gas, is contained in a flexible tube, and is driven by a system pressing the tube inside the pump. The peristaltic pump generally consists of a head, usually circular in shape, inside which is a flexible tube through which the fluid to be pumped advances.

This tube is deformed by a rotor provided with rollers, which compress it against the circular head. The rollers, which close off portions of the pipe as they rotate, will move the retained fluid in the same direction. Suction of the fluid at the pump inlet is possible due to the elasticity of the pipe.

At no time is the fluid in contact with the rotor. It is only in contact with the inside of the tube, which avoids any risk of contamination with the motion of the pump, or even of corrosion or abrasion of the latter by aggressive or charged fluids. Draining of the fluid is subject to pulsations due to the passage of the rollers.

Of course, any other pump that can operate at low speeds (that is, speeds of less than a few revolutions per hour) could also be used.

The proportional dosing pump also includes a motion converter 2 provided to transform the reciprocating translational motion of the member 16 of the hydraulic machine 16 into a rotational motion. This rotational motion is intended to be transmitted to the drive shaft 42 of the displacement, preferably peristaltic pump 4, so as to drive said pump.

Figure 3:
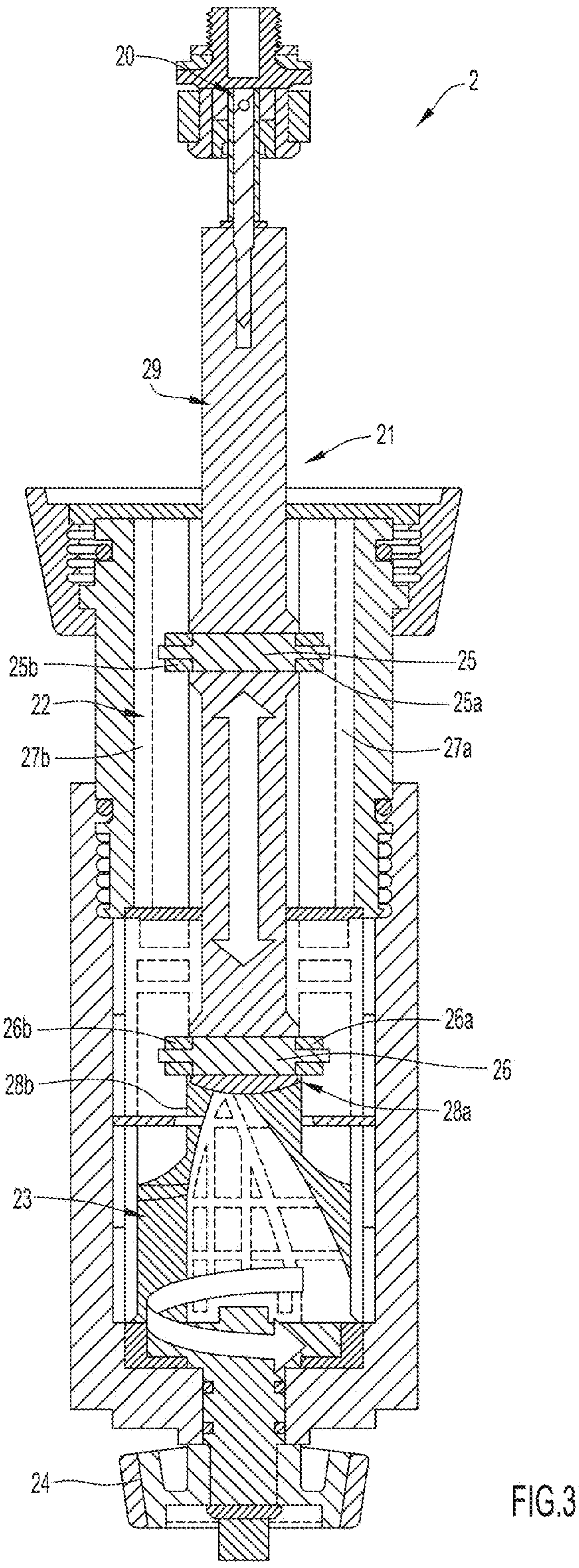
FIG. 3 This figure represents a detail of the converter of a proportional dosing pump according to an embodiment of the invention.

Now relating to the motion converter and according to a particular embodiment represented in [FIG. 3], the motion converter 2 includes a body 22, a rotor 23 itself housed in another body and provided with at least one helical rail and an actuator which extends longitudinally along the longitudinal axis x of the hydraulic machine. The body 22 is fixed relative to the hydraulic machine while the rotor 23 rotates relative to the hydraulic machine and while the actuator 21 translates relative to the hydraulic machine.

The actuator 21 is connected at one of its ends to the member 16 of the hydraulic machine and cooperates with the helical rail of the rotor 23.

Advantageously, s further provided a pinion 24 rotationally connected to the rotor 23, which constitutes an outlet of the converter in a rotational motion, which is therefore initially induced by the translation of the actuator 21.

According to a first embodiment, the actuator 21 comprises a shaft 29 connected to the member 16 of the hydraulic machine, a first piston pin 25 and a second piston pin 26 each mounted perpendicularly to the shaft 29 of the actuator.

In addition, the first piston pin 25 is provided to slide at a first end 25*a* in a first rectilinear rail 27*a* arranged in the body 22 of the motion converter 2 to prevent the shaft 29 from rotating and thus to guide it only translationally.

The second piston pin 26 is in turn provided to slide at a first end 26*a* in a first helical rail 28*a* arranged on the rotor 23, so as to rotationally drive the rotor, without the shaft 29 rotating.

According to a second embodiment, which this time has double guiding, the first piston pin 25 is provided to slide at a first end 25*a* and at a second end 25*b* respectively in a first rectilinear rail 27*a* and in a second rectilinear rail 27*b* arranged in the body 22 of the motion converter 2.

Similarly, the second piston pin 26 is in turn provided to slide at a first end 26*a* and at a second end 26*b* respectively in a first helical rail 28*a* and in a second helical rail 28*b* arranged on the rotor 23, so as to rotationally drive the rotor without the shaft 29 rotating.

By doubling the rails, the translational guiding and rotational locking of the shaft 29 are thus improved.

In addition, raising and then lowering the member 16 induces rotation of the rotor 23 in the same direction.

According to an alternative, the shaft 29 of the actuator 21 may be fitted with one or more longitudinal grooves each capable of accommodating a rib provided on the body 22 of the motion converter 2.

In this way, the cooperation of the grooves of the shaft 29 with the corresponding ribs of the body 22 of the motion converter 2, prevents the shaft 29 from rotating and thus enables it to be guided only translationally.

Preferably, the shaft 29 is connected to the member 16 of the hydraulic machine by means of a pivot connection 20. Indeed, the member 16 has a natural tendency to rotate on itself during operation. The pivot connection allows this motion to take place freely, thus preventing the shaft 29 from being unscrewed and/or irregular wear of the member 16.

According to a preferred embodiment, the proportional dosing pump includes a variator 3 provided to adjust the speed of rotation from the motion converter 2.

According to a particular embodiment represented in [FIG. 4], the variator 3 comprises an output shaft 32 substantially parallel to the axis (x) of the hydraulic machine, a toothed cone 30, the axis of revolution of which is inclined so that one of its longitudinal ridges extends in parallel to the output shaft 32.

A roller 33 is mounted to the output axis 32 so as to be rotationally integral with the output axis 32. The roller remains in contact with the toothed cone on its longitudinal ridge.

The output pinion 24 of the converter drives the toothed wheel of the cone 30, while the toothed cone 30 rotationally adhesively drives the roller 33.

In this way, the roller 33 drives the output shaft 32, which itself drives the drive shaft 42 of the displacement pump.

This variator comprises means 34, 340 for adjusting the position of the roller 33 along the output shaft 32 of the variator.

These means include a support 340 for fixing the roller, which support is integral with a stuffing box 34 mounted to the body of the rotor 23 and the 15 tightening/loosening of which on the body of the rotor 23 allows the movement of the roller along the output shaft 32.

Advantageously, the variator includes disengagement means 31 enabling the cone 30 to be moved away from the roller 33, so that the cone no longer adhesively drives the roller.

By contrast, the toothed wheel of the cone 30 remains in contact with the outlet of the converter (which is preferably the pinion 24).

According to a preferred embodiment, the disengagement means 31 consist of a pull rod passing through a support 35 integral with the body 22 of the motion converter 2 and anchored into the toothed cone, and of a spring mounted compressed on said pull rod to press the cone against the roller, tension on said pull rod further compressing the spring and enabling the cone to be moved away from the roller.

When the tensile stress exerted on the pull rod ceases, the spring returns to its original position and once again presses the cone against the roller.

In order to optimise the mixture between the main liquid (generally water) which arrives at the outlet 11 of the hydraulic machine, and the additive which arrives from the displacement, preferably peristaltic pump, the proportional dosing pump includes an injection tee 5 which is consequently supplied by the outlet 11 of the hydraulic machine and by the outlet 41 of the peristaltic pump.

Advantageously, the injection tee is provided with a first non-return valve and a second non-return valve provided respectively downstream of the outlet 11 of the hydraulic machine and downstream of the outlet 41 of the peristaltic pump to prevent backflow of the mixture respectively towards the hydraulic machine and towards the peristaltic pump.

As regards the proportional dosing method, the following steps are carried out

- the inlet 40 of the displacement, preferably peristaltic pump 4 is connected to a container filled with the additive to be dosed,
- the inlet 10 of the hydraulic machine 1 is connected to a source of main liquid,
- the inlet of the hydraulic machine is supplied with main liquid according to a predetermined flow rate.

When the proportional dosing pump is provided with a variator 3, the variator 3 is adjusted (for example by adjusting the position of the roller on the output shaft 32), as a function of the expected dosing, before supplying the inlet of the hydraulic machine with main liquid according to a predetermined flow rate.

Since the embodiments described below are by no means limiting, it will be possible especially to consider alternatives to the invention comprising only a selection of the described characteristics, isolated from the other described characteristics (even if this selection is isolated within a sentence comprising these other characteristics), if this selection of characteristics is sufficient to confer a technical advantage or to differentiate the invention with respect to prior art. This selection comprises at least one characteristic, preferably functional without structural details, or with only a part of the structural details if that part alone is sufficient to confer a technical advantage or to differentiate the invention from prior art.

It should be noted that the different characteristics, forms, alternatives and embodiments of the invention can be associated with one another, according to various combinations provided that they are not incompatible or mutually exclusive.

The invention claimed is:

1. A proportional dosing pump comprising a hydraulic machine having an inlet and an outlet, the hydraulic machine extending along a longitudinal axis and enclosing a member configured to reciprocate along the longitudinal axis, wherein supplying a main liquid to the inlet of the hydraulic machine triggers a reciprocating translational motion of the member along the longitudinal axis, and wherein the proportional dosing pump comprises:

a displacement pump, provided with an axis of rotation, an inlet intended to be placed in fluid communication with an additive reservoir, and an outlet in fluid communication with the outlet of the hydraulic machine, and a motion converter provided to transform the reciprocating translational motion of the member of the hydraulic machine into a rotational motion, said rotational motion being transmitted directly or indirectly to the displacement pump so that supplying the main liquid to the inlet of the hydraulic machine actuates the displacement pump which thus supplies additive from the additive reservoir to the outlet of the hydraulic machine, causing the additive to mix with the main liquid at the outlet of the hydraulic machine.

2. The proportional dosing pump according to claim 1, wherein the displacement pump is a peristaltic pump.

3. The proportional dosing pump according to claim 1, further comprising a variator configured to adjust a speed of the rotational motion transmitted to the displacement pump via the motion converter.

4. The proportional dosing pump according to claim 1, wherein the motion converter includes a rotor provided with at least one helical rail and an actuator which each extend longitudinally along the longitudinal axis of the hydraulic machine, a first end of the actuator being connected to the member of the hydraulic machine and a second end of the actuator cooperating with the at least one helical rail of the rotor, as well as an outlet output pinion of the motion converter that is connected to the rotor and configured to rotate with the rotor, wherein the reciprocating translational motion of the member of the hydraulic machine is configured to transmit the rotational motion to the displacement pump via rotation of the rotor.

5. The proportional dosing pump according to claim 4, wherein the actuator comprises a shaft connected to the member of the hydraulic machine, a first piston pin, and a second piston pin, wherein the first piston pin and the second piston pin are each mounted perpendicularly to the shaft of the actuator, the first piston pin being provided to slide in a first rectilinear rail arranged in the motion converter, while the second piston pin is provided to slide in the at least one helical rail of the rotor.

6. The proportional dosing pump according to claim 4, wherein the actuator comprises a shaft connected to the member, a first piston pin, and a second piston pin, wherein the first piston pin and the second piston pin are each mounted perpendicularly to the shaft of the actuator, the first piston pin having a first end and a second end configured to slide, respectively, in a first rectilinear rail and in a second rectilinear rail arranged in the motion converter, while the second piston pin has a first end and a second end configured to slide, respectively, in a first helical rail and in a second helical rail arranged on the rotor, each of the first helical rail and the second helical rail being a rail of the at least one helical rail.

7. The proportional dosing pump according to claim 5, wherein the shaft is connected to the member of the hydraulic machine by means of a pivot connection.

8. The proportional dosing pump according to claim 3, wherein the variator comprises an output shaft, a toothed cone, and a roller, wherein:

an axis of revolution of the variator is inclined relative to the output shaft so that a longitudinal ridge of the toothed cone of the variator extends in parallel to the output shaft;

the roller rotates with the output shaft and is capable of translating along the output shaft; and an output pinion of the motion converter meshes with the toothed cone, while the toothed cone rotationally drives the roller as well as the output shaft to transmit said rotational motion to the displacement pump.

9. The proportional dosing pump according to claim 8, wherein the variator comprises means for adjusting a position of the roller on the output shaft of the variator, the means for adjusting the position of the roller including a stuffing box mounted to a rotor of the motion converter, wherein tightening or loosening of the stuffing box on the rotor allows adjustment of the position of the roller along the output shaft of the variator.

10. The proportional dosing pump according to claim 8, wherein the variator includes disengagement means enabling the toothed cone to be moved away from the roller to prohibit the toothed cone from rotationally driving the roller.

11. The proportional dosing pump according to claim 10, wherein the disengagement means comprises a pull rod and a spring, wherein the pull rod passes through a support integral with the motion converter and is anchored into the toothed cone, and the spring is mounted to said pull rod and presses the toothed cone against the roller, wherein tension on said pull rod further compresses the spring and enables the toothed cone to be moved away from the roller.

12. The proportional dosing pump according to claim 1, further comprising an injection tee coupled to the outlet of the hydraulic machine and to the outlet of the displacement pump.

13. The proportional dosing pump according to claim 12, wherein the injection tee is provided with a first non-return valve and a second non-return valve provided to prevent backflow towards the hydraulic machine and towards the displacement pump, respectively.

14. A proportional dosing method implementing the proportional dosing pump according to claim 3, comprising:

connecting the inlet of the displacement pump to a container filled with the additive to be dosed, connecting the inlet of the hydraulic machine to a source of the main liquid, adjusting the variator to adjust the speed of the rotational motion transmitted to the displacement pump via the motion converter as a function of an expected dosage of the additive, and supplying the inlet of the hydraulic machine with the main liquid at a predetermined flow rate, so that the hydraulic machine actuates the displacement pump, causing the additive to mix with the main liquid.

15. The proportional dosing method of claim 14, wherein the outlet of the displacement pump is provided with an injection tee via which the displacement pump supplies the additive to the main liquid.

* * * * *